(12) United States Patent
Furihata et al.

(10) Patent No.: US 9,354,495 B2
(45) Date of Patent: *May 31, 2016

(54) PROJECTION DISPLAY DEVICE AND METHOD FOR CONTROLLING THE SAME

(71) Applicant: Seiko Epson Corporation, Tokyo (JP)

(72) Inventors: Takeshi Furihata, Okaya (JP);
Hirokazu Kamatori, Matsumoto (JP);
Shigehiro Yanase, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 14/260,949

(22) Filed: Apr. 24, 2014

(65) Prior Publication Data

US 2014/0232991 A1 Aug. 21, 2014

Related U.S. Application Data

(63) Continuation of application No. 13/270,479, filed on Oct. 11, 2011, now Pat. No. 8,740,392.

(30) Foreign Application Priority Data

Oct. 12, 2010 (JP) .................................. 2010-229795

(51) Int. Cl.
*G03B 21/16* (2006.01)
*F24F 13/14* (2006.01)
(Continued)

(52) U.S. Cl.
CPC . *G03B 21/16* (2013.01); *F24F 7/00* (2013.01); *F24F 13/14* (2013.01); *G03B 21/14* (2013.01); *G03B 31/04* (2013.01); *H04N 9/3144* (2013.01)

(58) Field of Classification Search
CPC ...... G03B 21/14; G03B 21/16; H04N 9/3144; E06B 7/08; F24F 13/14; F24F 7/00
See application file for complete search history.

(56) References Cited

U.S. PATENT DOCUMENTS 7,338,174 B2 3/2008 Koba et al.
8,740,392 B2 * 6/2014 Furihata et al. ................. 353/52
(Continued)

FOREIGN PATENT DOCUMENTS

CN 101382725 A 3/2009
JP 2002-367791 A 12/2002
(Continued)

OTHER PUBLICATIONS

Non-Final Office Action received in U.S. Appl. No. 13/270,479; Oct. 3, 2013.
(Continued)

*Primary Examiner* — Sultan Chowdhury
*Assistant Examiner* — Magda Cruz
(74) *Attorney, Agent, or Firm* — ALG Intellectual Property, LLC

(57) ABSTRACT

In at least one embodiment, a projection display device comprises a device main body, a shutter that opens and closes an opening for ventilation, and an electricity storage section that stores power from an external power source. If an interruption detecting section detects a power supply from the external power source is stopped and a time in which the power supply is stopped is longer than a predetermined time, the interruption detecting section detects that the external power source is interrupted. If the interruption of the external power source is detected, a control section performs a control to reduce a power consumption of the device main body and a control to drive the shutter so that the shutter is closed by the power supplied from the electricity storage section.

11 Claims, 8 Drawing Sheets

(51) Int. Cl.
*F24F 7/00* (2006.01)
*G03B 21/14* (2006.01)
*H04N 9/31* (2006.01)
*G03B 31/04* (2006.01)

(56) References Cited

U.S. PATENT DOCUMENTS

2009/0067275 A1 3/2009 Yasuda
2012/0013856 A1 1/2012 Yasuda
2012/0086918 A1 4/2012 Furumi

FOREIGN PATENT DOCUMENTS

| | | | |
|---|---|---|---|
| JP | 3453775 B | 10/2003 | |
| JP | 3827644 B | 9/2006 | |
| JP | 2007-033792 A | 2/2007 | |
| JP | 2007-316389 A | 12/2007 | |
| JP | 4023490 B | 12/2007 | |
| JP | 2009-098481 A | 5/2009 | |
| JP | 2009098481 A * | 5/2009 | ............ G03B 21/16 |
| JP | 2010-122261 A | 6/2010 | |
| JP | 2012-083553 A | 4/2012 | |
| JP | 2012-083555 A | 4/2012 | |

OTHER PUBLICATIONS

Notice of Allowance and Notice of Allowability received in U.S. Appl. No. 13/270,479; Feb. 3, 2014.

* cited by examiner

PROJECTION DISPLAY DEVICE AND METHOD FOR CONTROLLING THE SAME

CROSS-REFERENCE

The present application is a continuation application of U.S. patent application Ser. No. 13/270,479 filed on Oct. 11, 2011 which claims priority from Japanese Patent Application No. 2010-229795 filed on Oct. 12, 2010, which are hereby expressly incorporated by reference in their entirety.

BACKGROUND

1. Technical Field

The present invention relates to projection display devices and methods for controlling the projection display device.

2. Related Art

A projection display device (a projector) having an opening and closing mechanism (a shutter) that opens and closes an exhaust port (an opening for ventilation) and uses a drive motor as a drive source of the opening and closing mechanism has been proposed (see, for example, Japanese Patent No. 3,453,775 (Patent Documents 1) and JP-A-2009-98481 (Patent Document 2)). The projection display device of this kind generally operates by using an external power source as operating power, and is operable when a power cable extending from the projection display device is connected to a receptacle via a plug.

In the configuration of Patent Document 1, when the plug is disconnected, the opening and closing mechanism cannot be driven and therefore the exhaust port cannot be closed. If the exhaust port is not closed, dust and insects enter the device. Moreover, in the existing configuration, since the opening and closing mechanism is driven by the drive motor, it takes time before the exhaust port is completely closed, and the user has to wait for the exhaust port to be completely closed. In this case, there is a possibility that the user disconnects the plug before the exhaust port is completely closed and the exhaust port is left open.

On the other hand, in Patent Document 2, a configuration is described in which power is supplied from a standby power source section when an interruption of an external power source is detected and, after cooling is performed by a cooling device for a predetermined time, the exhaust port is closed.

However, in the configuration of Patent Document 2, it is necessary to supply power to the cooling device after the interruption of the external power source. As a result, there is a possibility that power is consumed before the exhaust port is closed, making it impossible to close the exhaust port. Moreover, the standby power source section increases in capacity.

A state in which the exhaust port is not closed when the external power source is interrupted is an undesirable state for, in particular, a projection display device to which dust prevention measures are applied so that the device can be used in a dust-prone region, that is, a dustproof projection display device (a dustproof projector).

SUMMARY

An advantage of some aspects of the invention is to provide a projection display device that closes an opening reliably when an external power source is interrupted and a method for controlling the projection display device.

An aspect of the invention is directed to a projection display device using an external power source as operating power, including: a device main body including an image projecting section projecting an image; a shutter that opens and closes an opening for ventilation, the opening of the device main body; an electricity storage section storing power from the external power source and supplying the stored power as operating power when the external power source is interrupted; an interruption detecting section detecting an interruption of the external power source; and a control section that transitions the state to a state in which the power consumption of the device main body is reduced and drives the shutter so that the shutter is closed when an interruption of the external power source is detected.

With this configuration, when an interruption of the external power source is detected, the state is made to transition to a state in which the power consumption of the device main body is reduced and the shutter is driven so that it is closed. Therefore, it is possible to reduce the power consumption of the portion that is irrelevant to the shutter control, assign finite power stored in the electricity storage section to the driving to close the shutter, and close the opening reliably when the external power source is interrupted. Moreover, it is possible to reduce unnecessary electric power consumption and reduce costs and size by optimizing the storage parts inside a power source.

According to this configuration, by making a distinction between an instantaneous power failure and an interruption of the external power source, it is possible to prevent the occurrence of a malfunction. Moreover, when an instantaneous power failure occurs, it is possible to operate the projection display device continuously. This improves the usability of the projection display device.

That is, when a discharge lamp is adopted as a light source device of the projection display device, a predetermined waiting time is necessary to turn on a discharge lamp again, the discharge lamp which has been turned off. However, according to this configuration, even when a voltage drop in the external power source is detected due to the occurrence of an extreme brief instantaneous power failure, the power supply to the light source device is not immediately stopped. Therefore, the discharge lamp can stay on. If the power supply to the discharge lamp is immediately stopped when a voltage drop in the external power source is detected, an image cannot be displayed until awaiting time necessary for turning on the discharge lamp again has elapsed. In this configuration, such a problem does not arise.

According to this configuration, it is possible to reduce the power consumption of the light source immediately after the occurrence of a power failure or after a plug is disconnected, making it possible to save the stored power of the electricity storage section.

According to this configuration, it is possible to stop the driving of the portion that is irrelevant to the shutter control, and thereby reduce the electric power consumption and secure power necessary for the driving to close the shutter.

According to this configuration, it is possible to close the shutter in a short time as compared to a case in which the shutter is driven by a motor so that it is closed. This makes it possible to prevent the entry of dust and insects and achieve reduction in cost and size by reducing the capacity of the electricity storage section.

According to this configuration, the amount of power necessary for the driving to close the shutter is small. This also makes it possible to close the shutter reliably and provide a low-cost and long-life product.

According to this configuration, the entry of dust and insects through a suction port is prevented by a dust filter, and, by closing an exhaust port with the shutter, a vent hole of the projection display device is closed, whereby the entry of dust and insects into the projection display device is reliably prevented.

Another aspect of the invention is directed to a method for controlling a projection display device which uses an external power source as operating power including a device main body provided with an image projecting section projecting an image and a shutter that opens and closes an opening of the device main body for ventilation, wherein when an interruption of an external power source is detected, the state is made to transition to a state in which the power consumption of the device main body is reduced and the shutter is driven so that the shutter is closed, using stored power from an electricity storage section that stores power from the external power source. According to this configuration, it is possible to reduce the power consumption of the portion that is irrelevant to the shutter control, assign finite power stored in the electricity storage section to the driving to close the shutter, and close the opening reliably when the external power source is interrupted. In addition, it is possible to reduce unnecessary electric power consumption and reduce costs and size by optimizing the storage parts inside the power source.

According to the aspects of the invention, it is possible to close the opening reliably when the external power source is interrupted.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Figure 1:
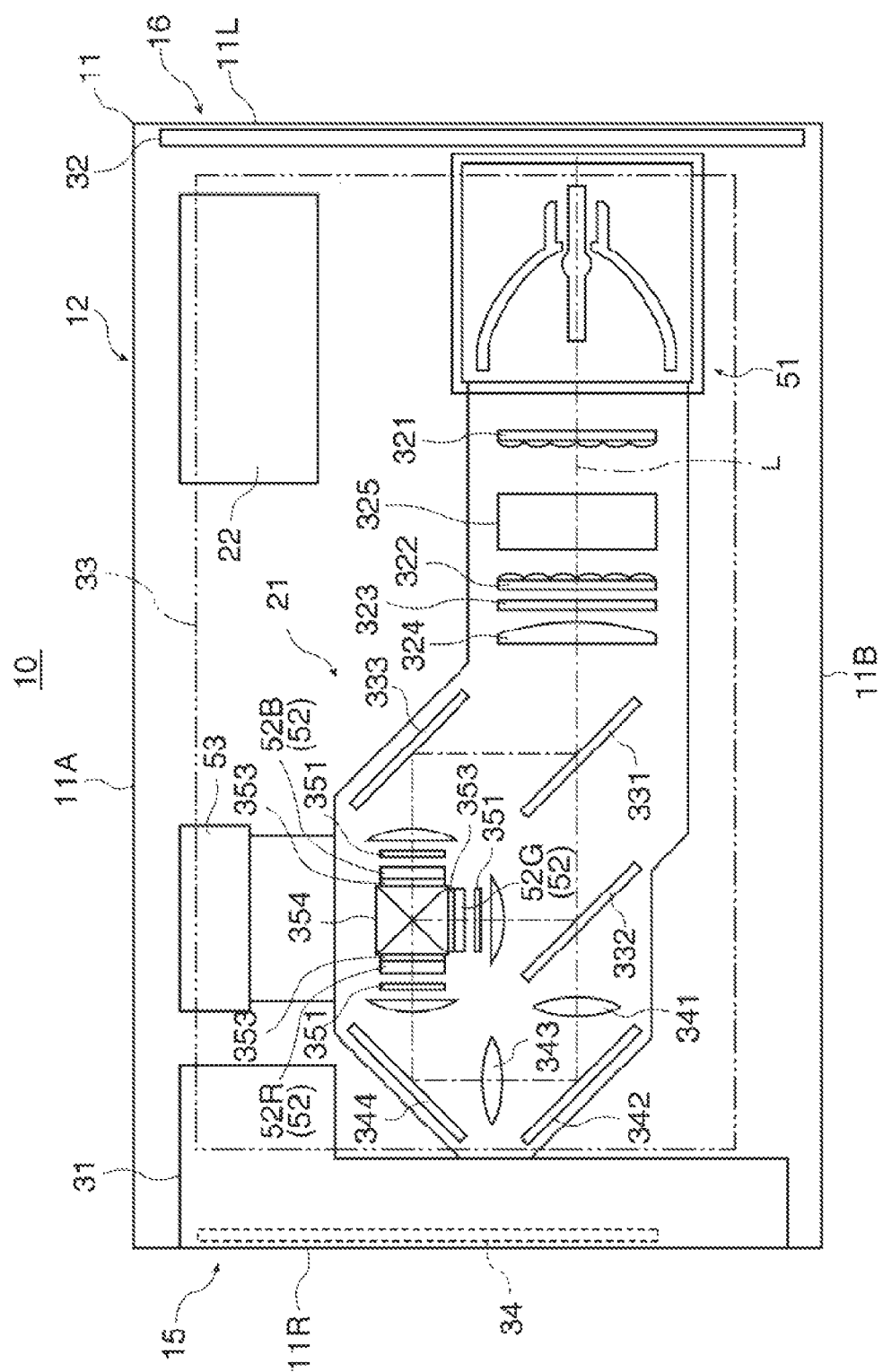
FIG. 1 is a diagram showing an internal structure of a projector according to an embodiment of the invention.
Figure 2:
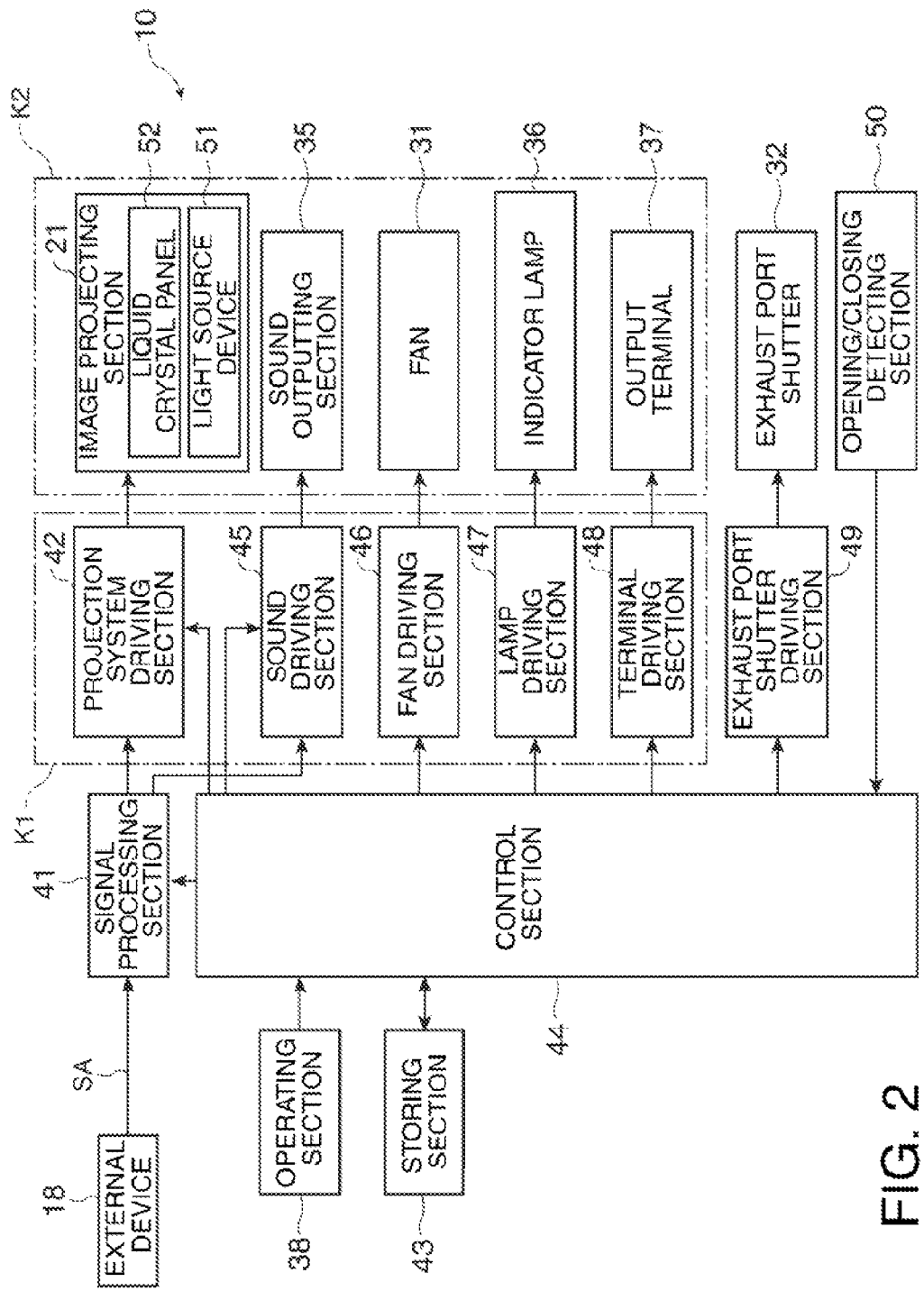
FIG. 2 is a block diagram showing a functional configuration of the projector.

FIG. 1 is a diagram showing an internal structure of a projector (a projection display device) 10 according to the embodiment of the invention, and FIG. 2 is a block diagram showing a functional configuration of the projector 10.

As shown in FIG. 1, the projector 10 is a device including an image projecting section 21 projecting an image light representing an image and making the image projecting section 21 display an image (a projected image) on a screen (not shown) which is a projection surface. The projector 10 includes, inside a casing 11, a device main body 12 in which projector component parts such as the image projecting section 21 are provided and an outer cover (not shown) covering the device main body 12.

The casing 11 has a virtually rectangular shape in a plan view. In one of left and right side faces (shorter sides) 11L and 11R of the casing 11, a suction port 15 is provided, and, in the other side face, an exhaust port 16 is provided. Here, in FIG. 1, a front face of the casing 11 (a face in which a projection lens 53 of the image projecting section 21 is exposed) is assigned a reference character 11A, and a back face of the casing 11 is assigned a reference character 11B. A side face of the casing 11 which is located on the left side when the casing 11 is viewed from the front face 11A is depicted as a left side face 11L, and a side face of the casing 11 which is located on the right side when the casing 11 is viewed from the front face 11A is depicted as a right side face 11R.

Inside the casing 11, a cooling fan 31 is disposed on the side of the suction port 15, an exhaust port shutter 32 is disposed on the side of the exhaust port 16, and, in a region between the cooling fan 31 and the exhaust port shutter 32, the image projecting section 21 and a power source section 22 are disposed. Moreover, inside the casing 11, a circuit board 33 having a control section 44 and the like shown in FIG. 2 is also provided. The outer cover covers the casing 11 other than the suction port 15 and the exhaust port 16. As a result, outside air is introduced into the casing 11 through the suction port 15 by the cooling fan 31 and is exhausted through the exhaust port 16 after the individual sections such as the image projecting section 21 are cooled by the cooling air.

In the projector 10 with this structure, as shown in FIG. 1, in the suction port 15 which is one side of an opening for ventilation, a dust filter 34 is disposed, and, in the exhaust port 16 which is the other side of the opening for ventilation, the exhaust port shutter 32 that opens and closes the exhaust port 16 is disposed. Therefore, it is possible to prevent the entry of dust and insects through the openings 15 and 16. That is, the projector 10 is configured as a "dustproof projector" that is suitable for the use in a dust-prone region.

Moreover, the projector 10 with this structure is configured so that it can perform cooling by the cooling fan 31 when the individual sections such as the image projecting section 21 are operating and make it unnecessary to perform cooling by the cooling fan 31 immediately after the operations of the individual sections are stopped to improve the materials of these sections, for example.

The circuit board 33 has a signal processing section 41, a projection system driving section 42, a storing section 43, a control section 44, a sound driving section 45, a fan driving section 46, a lamp driving section 47, a terminal driving section 48, and an exhaust port shutter driving section 49 (see FIG. 2).

As shown in FIG. 2, the signal processing section 41 includes an image processing system that receives a video signal SA (in this configuration, a signal containing only an image or a signal containing both an image and sound) from an external device (such as a personal computer and a DVD player) 18 which is connected via a cable and performs image processing on image data corresponding to the signal SA and a sound processing system that performs sound processing on sound data corresponding to the signal SA.

Here, the image processing system performs IP conversion by which the format of the image data is converted from interlaced to progressive, resolution conversion processing on the image data subjected to IP conversion to increase or reduce the size, various kinds of color correction such as adjustment of the lightness and color saturation, and the like.

The projection system driving section 42 functions as a liquid crystal panel driving section and a light source driving section that drive a liquid crystal panel 52 and a light source device 51, respectively, of the image projecting section 21. The projection system driving section 42 drives the liquid crystal panel 52 and the light source device 51 based on the image data on which image processing has been performed by the signal processing section 41 and thereby makes the liquid crystal panel 52 and the light source device 51 display an image.

As shown in FIG. 1, the image projecting section 21 has a virtually L shape in a plan view, the L shape extending along the back face 11B which is one of the longer sides of the casing 11 and extending to the front face 11A along the side faces 11L and 11R which are shorter sides of the casing 11, and includes the light source device 51 functioning as a light source, the liquid crystal panel (which is also referred to as the liquid crystal light valve) 52 (52R, 52G, 52B), and the projection lens 53.

The light source device 51 includes a xenon lamp, an ultra-high pressure mercury lamp, or the like. The liquid crystal panel 52 is formed as a transmissive liquid crystal panel in which a plurality of pixels are arranged in a matrix. The liquid crystal panel 52 modulates an illumination light (indicated by a reference character L in FIG. 1) from the light source device 51 into an image light representing an image by changing the light transmittance of each pixel by the driving of the projection system driving section 42, and makes the image light exit from the projection lens 53.

In this embodiment, a case in which the projector 10 is a three LCD projector is shown. In this case, as shown in FIG. 1, three liquid crystal panels 52R, 52G, and 52B corresponding to three colors R, G, and B and optical components (such as lenses 321 to 324, 341, and 343, a dimmer 325, dichroic mirrors 331 and 332, reflection mirrors 333, 342, and 344, polarizing plates 351 and 353, and a prism 354) for performing separation and condensing of the light from the light source device 51 are provided.

With this configuration, it is possible to generate a color image by separating the light from the light source device 51 into lights of three colors R, G, and B, making the lights pass through the liquid crystal panels 52R, 52G, and 52B, and combining the lights with the prism 354. Incidentally, the configuration of the image projecting section 21 is not limited to the configuration shown in FIG. 1, and a wide range of publicly known configurations can be adopted. Moreover, a publicly known configuration having one liquid crystal panel 52 may be adopted.

As shown in FIG. 2, various kinds of program products such as a control program product and various kinds of data are stored in the storing section 43.

The control section 44 functions as a computer controlling the individual sections of the projector 10 by reading and executing the control program product stored in the storing section 43.

The projector 10 is further provided with a sound outputting section 35 formed of a speaker and the like, an indicator lamp (in this embodiment, a light emitting diode (LED)) 36 for notifying the user of the operating state (power-on, a standby state, an error state, and the like) of the projector 10, an output terminal 37 (a TriggerOut terminal outputting TriggerOut to an unillustrated external device, a USB terminal, and the like) outputting TriggerOut and a power signal (USB bus power), an operating section 38 having various kinds of operators used by the user to giving various instructions, and the like.

Under control of the control section 44, the sound driving section 45 drives the sound outputting section 35 of the projector 10 and makes the sound outputting section 35 produce various kinds of sound corresponding to the sound data output from the signal processing section 41, such as sound, operation sound, and beep sound.

Under control of the control section 44, the lamp driving section 47 turns on/off each indicator lamp 36 by driving/not driving a plurality of indicator lamps (notifying sections) 36 (including making them flash) selectively, and thereby notifies the user of power-on, a standby state (a state in which greater power savings are achieved than in a power-on state: a state in which part of functions is enabled (for example, a state in which operation of a main body operating section (the operating section 38) and operation of an unillustrated remote control are accepted and a standby monitor out function is enabled)), an error state, and the like.

Under control of the control section 44, the terminal driving section 48 outputs TriggerOut for notifying an external device (such as a screen apparatus) of power-on of the projector 10 and a power signal for supplying power to a USB external device to the outside via the output terminal 37.

Under control of the control section 44, the exhaust port shutter driving section (the shutter driving section) 49 drives the exhaust port shutter 32 so that the exhaust port shutter 32 is opened/closed. When the power is turned on by the operation performed on the operating section 38, the exhaust port shutter driving section drives the exhaust port shutter 32 so that it is opened; when the power is turned off by the operation performed on the operating section 38, the exhaust port shutter driving section drives the exhaust port shutter 32 so that it is closed.

The opening/closing detecting section 50 is a switch mechanism that detects opening and closing of the exhaust port shutter 32. The control section 44 can detect the open/closed state of the exhaust port shutter 32 by obtaining the detection result of the opening/closing detecting section 50.

Figure 3:
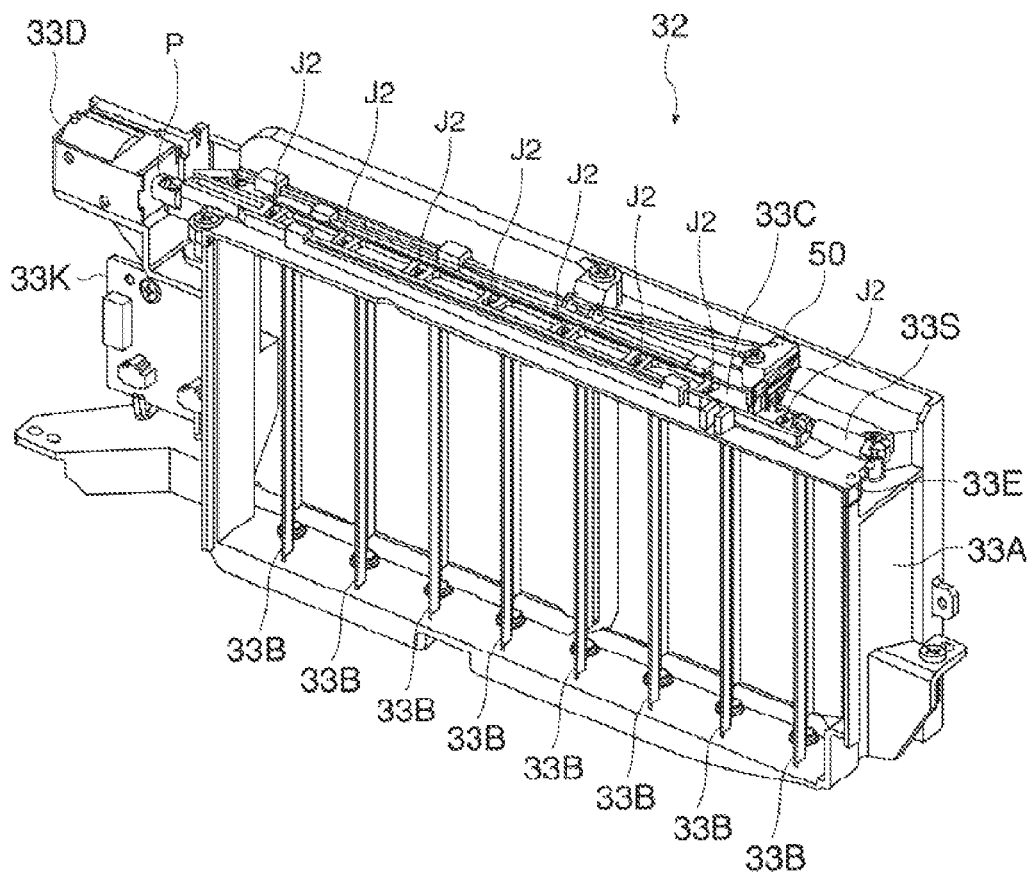
FIG. 3 is a perspective view showing an open state of an exhaust port shutter.
Figure 4:
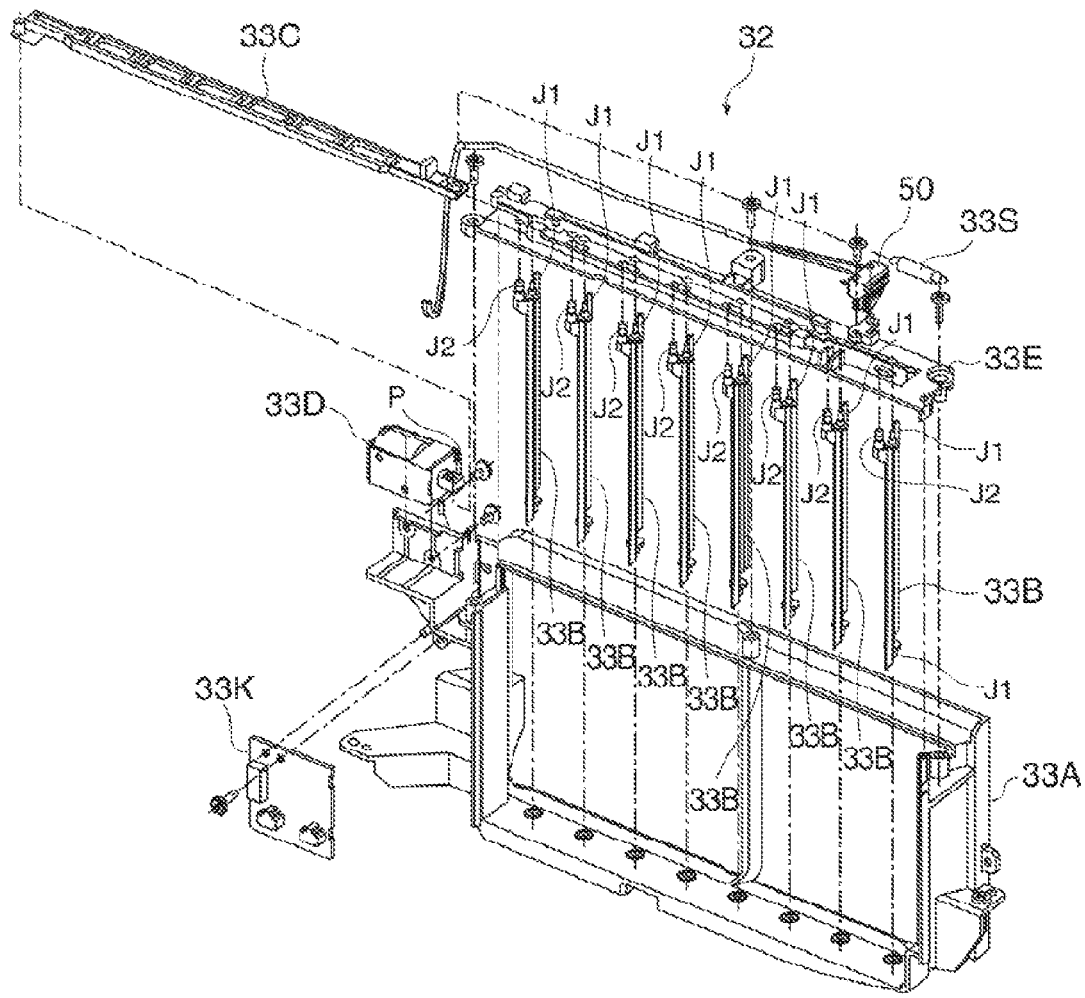
FIG. 4 is an exploded perspective view of the exhaust port shutter.
Figure 5:
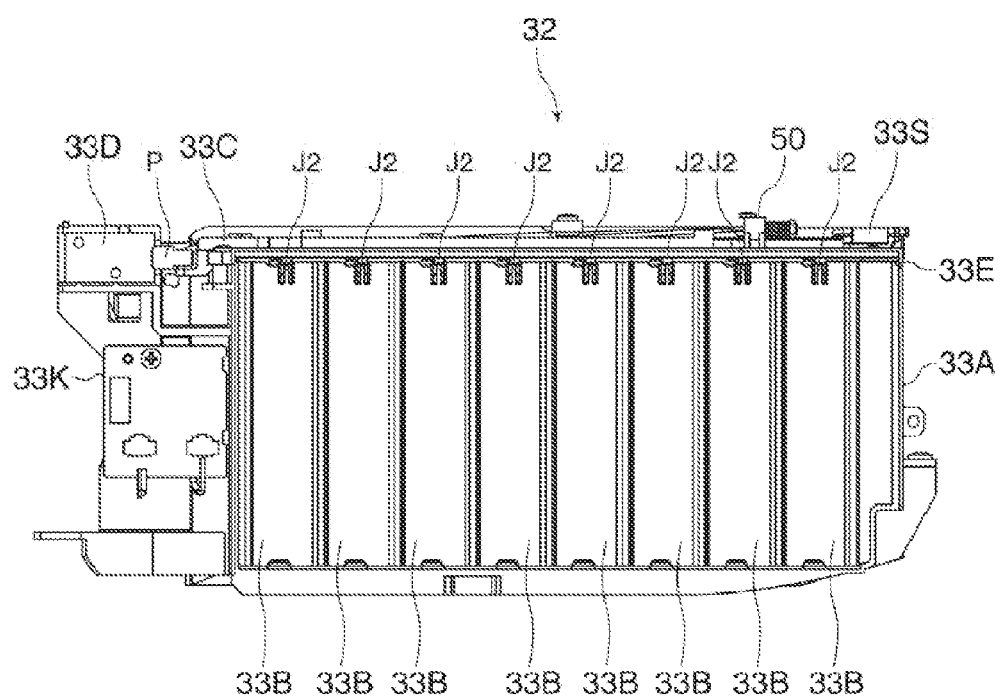
FIG. 5 is a diagram showing a closed state of the exhaust port shutter.

Here, FIG. 3 is a perspective view showing an open state of the exhaust port shutter 32, and FIG. 4 is an exploded perspective view of the exhaust port shutter 32. FIG. 5 is a diagram showing a closed state of the exhaust port shutter 32.

As shown in FIGS. 3 to 5, the exhaust port shutter 32 includes a frame 33A having a shape of a rectangular frame, a plurality of (in this structure, eight) louvers 33B which are placed at regular spacings in a longitudinal direction in such away as to be able to open and close an opening (an opening communicating with the exhaust port 16) of the frame 33A, a cam plate 33C which is slidably placed in the frame 33A, and a solenoid 33D that operates the cam plate 33C.

As shown in FIG. 4, the frame 33A includes a plate-like member 33E forming part of an upper frame as a separate component, and turnably supports a turning shaft J1 jutting from the upper and lower ends of each louver 33B by a lower frame of the frame 33A and the plate-like member 33E.

On the plate-like member 33E, the cam plate 33C is slidably supported, and a projecting shaft J2 jutting upward with a space left between the projecting shaft J2 and the turning shaft J1 of each louver 33B is placed through the cam plate 33C.

As a result, when the cam plate 33C is slid, all the louvers 33B turn about the turning shafts J1 and open and close the opening of the frame 33A.

The solenoid 33D is fixed to the frame 33A, and a plunger P of the solenoid 33D is connected to one end of the cam plate 33C. Incidentally, in the drawing, a reference character 33K denotes a circuit board for driving the solenoid.

In the exhaust port shutter 32, a biasing member (in this embodiment, an extension spring) 33S which biases the cam plate 33C to a shutter close side. The biasing member 33S makes it possible to keep the exhaust port shutter 32 in a closed state reliably.

The solenoid 33D is a keep solenoid (also called a self-holding solenoid). As a result of the cam plate 33C being pulled toward the solenoid 33D against the biasing force of the biasing member 33S by the exhaust port shutter driving section 49, the exhaust port shutter 32 is driven so that it is opened (sucking operation of the solenoid), and the exhaust port shutter 32 is kept in an open state as a result of the plunger P of the solenoid 33D sticking to a built-in permanent magnet thereto by the magnetomotive force of the built-in permanent magnet (sticking operation of the solenoid).

Moreover, the solenoid 33D drives the exhaust port shutter 32 so that it is closed by restoring to its former state by a reverse magnetomotive force which is generated by a coil and cancels out the magnetomotive force of the built-in permanent magnet by the exhaust port shutter driving section 49 (restoring operation of the solenoid).

Incidentally, the opening/closing detecting section 50 that detects opening and closing of the exhaust port shutter 32 is formed as a switch mechanism that is attached to the plate-like member 33E of the exhaust port shutter 32 and opens and closes in accordance with the position of the cam plate 33C.

Figure 6:
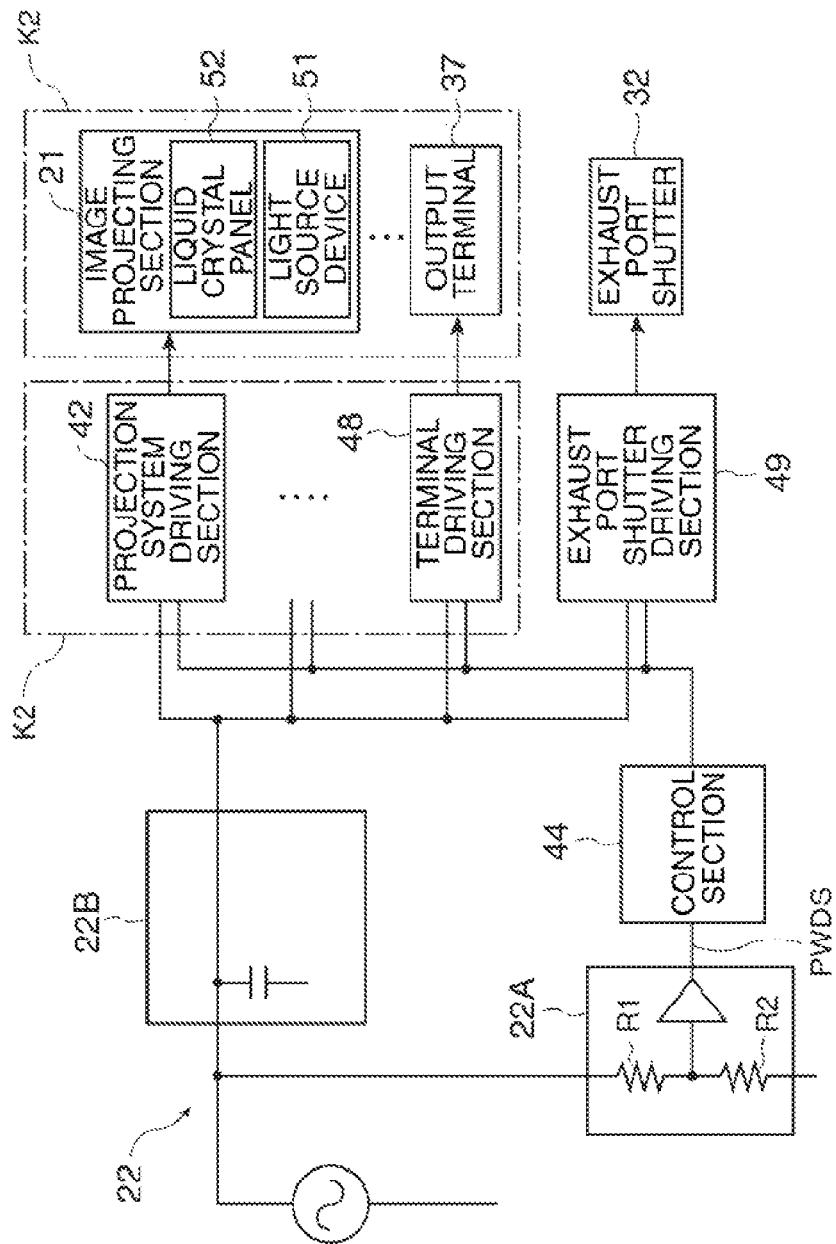
FIG. 6 is a diagram showing a power source section along with peripheral components.

FIG. 6 is a diagram showing the power source section 22 along with peripheral components.

The power source section 22 is supplied with power of an external power source which is a commercial power source sent from an electric power company by being connected, via an unillustrated plug, to a receptacle located inside a building or the like, and supplies power to the individual sections of the projector 10. That is, the projector 10 is driven by using the external power source as operating power.

Incidentally, since the projector 10 with this configuration is a dustproof projector, if the exhaust port shutter 32 is left open when the external power source is interrupted as a result of a power failure or the plug being disconnected, entry of dust cannot be prevented. Such a situation is undesirable.

Therefore, to improve substantive dust-proofness, this configuration includes the following configuration so that control to close the exhaust port shutter 32 reliably is performed when the external power source is interrupted. Hereinafter, the above configuration will be described in detail.

First, the power source section 22 includes an external power source detecting section 22A outputting an output signal PWDS whose signal level is switched when the power supply of the external power source is unexpectedly interrupted due to a power failure or disconnection of the plug and an electricity storage section 22B that stores power of the external power source and supplies alternative power when the external power source is interrupted.

The output signal PWDS of the external power source detecting section 22A described above is output to the control section 44, and the control section 44 determines whether or not the external power source is interrupted based on the signal level of the output signal PWDS. That is, the external power source detecting section 22A and the control section 44 function as an interruption detecting section detecting an interruption of the external power source.

Incidentally, in FIG. 6, resistances denoted by reference characters R1 and R2 are resistance values forming a voltage-dividing circuit that divides a power-source voltage at a predetermined division ratio, and the power-source voltage value obtained by voltage dividing performed by the voltage-dividing circuit is used as the output signal PWDS.

As the electricity storage section 22B, a capacitor such as an electric double layer capacitor is used. Since the electric double layer capacitor physically performs charging and discharging without using an electrochemical reaction, the electric double layer capacitor suffers minimal performance degradation and possesses outstanding long-term reliability.

Next, interruption control (direct power off) which is performed when the external power source of the projector 10 is unexpectedly interrupted will be described.

Figure 7:
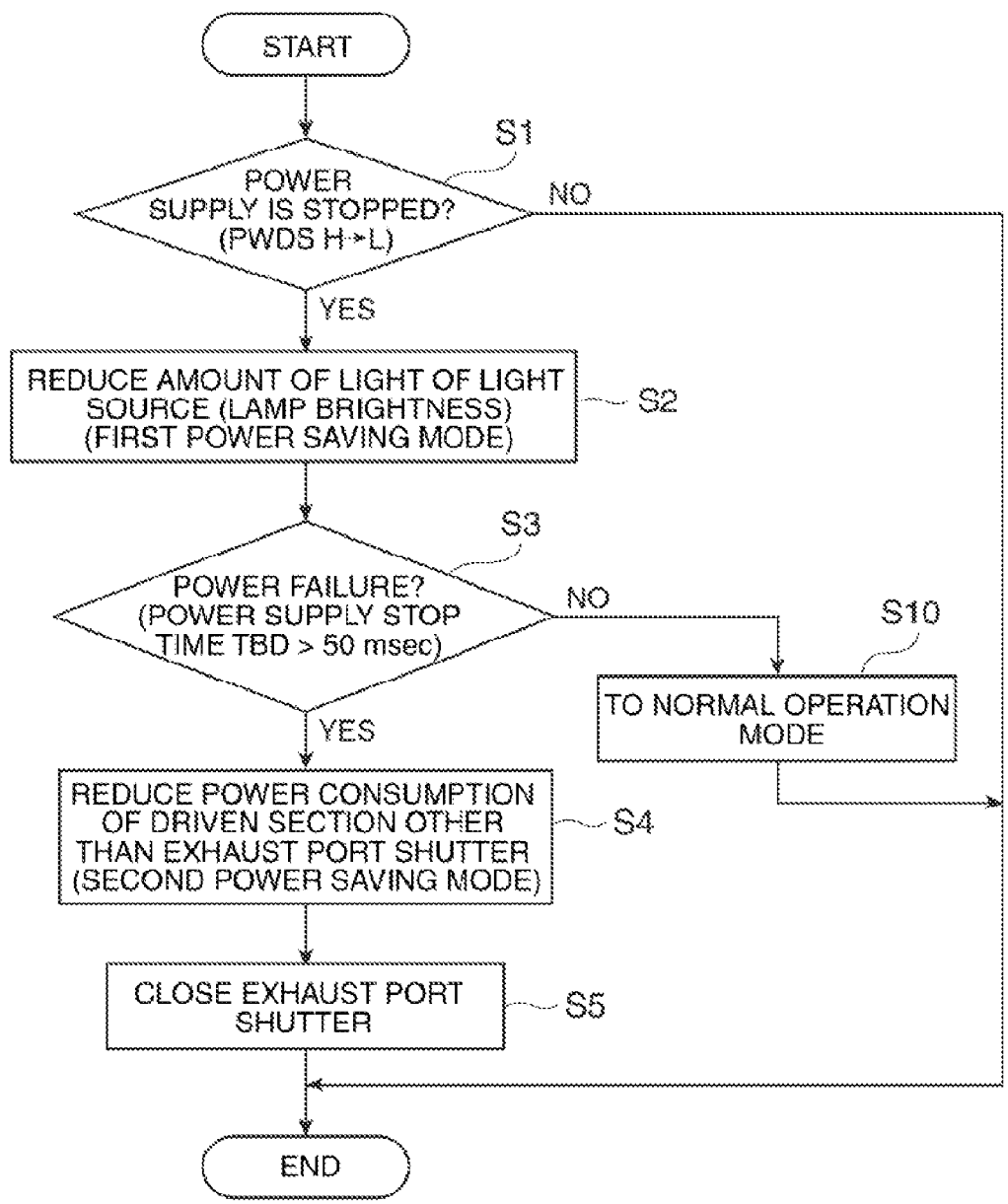
FIG. 7 is a flowchart showing interruption control.

FIG. 7 is a flowchart showing the interruption control. The interruption control is processing which is performed repeatedly with a predetermined interrupt period when power is supplied from the external power source and the projector is turned on.

Here, in the following description, when the exhaust port shutter driving section 49 and the other driving sections 42 to 48 are described separately, as shown in FIG. 2 and FIG. 6, the other driving sections 42 to 48 are collectively expressed as a driving section K1, and the objects to be driven by the driving section K1 are collectively expressed as a driven section K2.

First, the control section 44 determines whether or not the power supply from the external power source is stopped based on the output signal PWDS of the external power source detecting section 22A (step S1). Specifically, since the signal level of the output signal PWDS is reduced when the power supply is stopped, the control section 44 determines that the power supply from the external power source is stopped when the output signal PWDS is switched from H level to L level with reference to a predetermined threshold value.

When the power supply from the external power source is stopped (step S1: YES), the control section 44 immediately starts light amount reduction processing by the projection system driving section 42, the light amount reduction processing by which the amount of light (lamp brightness) of the light source device 51 is reduced to a previously set low level (step S2), and starts instantaneous power failure determination processing by which it is determined whether or not there is an instantaneous power failure based on the power supply stop time TBD (step S3). Incidentally, when the power supply is stopped, power from the electricity storage section 22B is immediately supplied as operating power, whereby the individual sections can continue operating.

In the instantaneous power failure determination processing, if the stop time TBD exceeds a previously set reference time (in this embodiment, 50 msec), the control section 44 determines that a power failure that is not an instantaneous power failure (that is, an interruption of the external power source (a power failure)) has occurred (step S3: YES); if the power supply is resumed before the stop time TBD exceeds the reference time, the control section 44 determines that an instantaneous power failure has occurred (step S3: NO). Incidentally, in the light amount reduction processing, the power consumption is reduced by reducing the amount of light to an extent that the user can continue viewing the images.

If an instantaneous power failure has occurred (step S3: NO), the control section 44 ends the light amount reduction processing and thereby increases the amount of light (lamp brightness) of the light source device 51 to a normal light amount, and transitions from a first power saving mode to a normal operation mode (step S10). This allows the user to continue viewing the bright images.

That is, in this configuration, when the power supply from the external power source is stopped, the mode transitions to the first power saving mode in which the power consumption of the light source device 51 whose power consumption is highest in the driven section K2 is immediately reduced. In the first power saving mode, the amount of light is reduced to an extent that the user or the like can continue viewing the images. This makes it possible to reduce the power consumption efficiently while allowing the user or the like to continue viewing the images.

If an instantaneous power failure has occurred (step S3: NO) or the power supply of the external power source is not stopped (step S1: NO), since the projector 10 is in a power source state in which the projector 10 remains in a power-on state and can perform normal operation, it is possible to keep the exhaust port shutter 32 in an open state, end the interruption control, and return to normal operation.

On the other hand, if the external power source is interrupted (a power failure has occurred) (step S3: YES), the control section 44 transitions the mode to a second power saving mode in which the power consumption of the driven section K2 other than the exhaust port shutter 32 is reduced by the driving section K1 (step S4).

Figure 8:
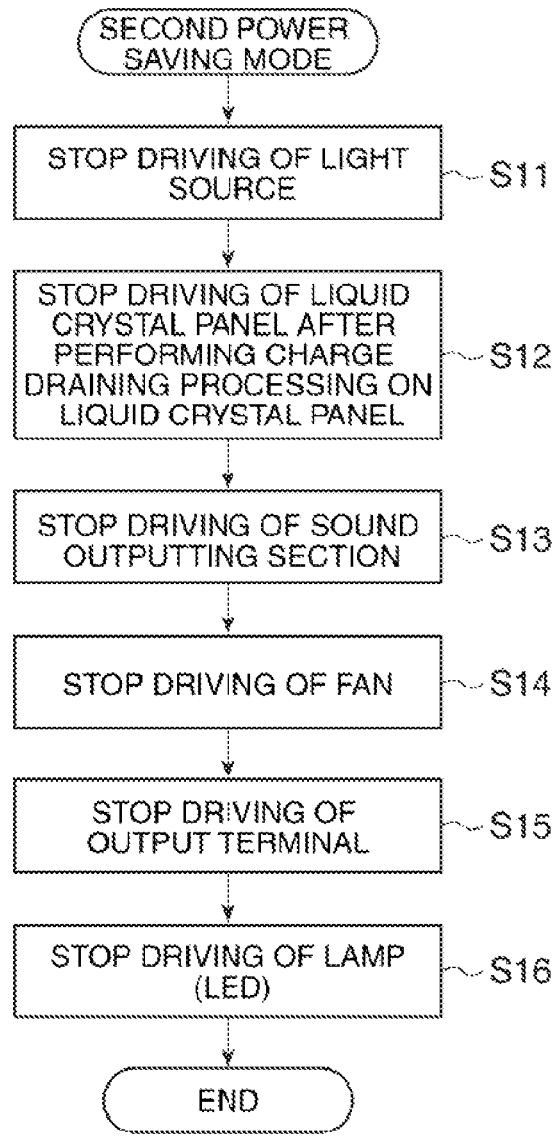
FIG. 8 is a flowchart showing a second power saving mode.

FIG. 8 is a flowchart showing the second power saving mode.

As shown in FIG. 8, the control section 44 stops the driving of the light source device 51 (turns the light off) by the projection system driving section 42 (step S11), and stops the driving of the liquid crystal panel 52 after performing charge draining processing on the liquid crystal panel 52 by the projection system driving section 42 (step S12). Then, the control section 44 stops the driving of the sound outputting section 35 by the sound driving section 45 (step S13), stops the driving of the cooling fan 31 by the fan driving section 46 (step S14), stops the driving of the output terminal 37 by the terminal driving section 48 (step S15), and stops the driving of the indicator lamp 36 by the lamp driving section 47 (step S16). Incidentally, the driving of the individual sections is stopped in descending order of the amount of electric power consumption. Thus, it is possible to reduce the electric power consumption efficiently. It is to be noted that, in FIG. 8, a case in which the control section 44 stops the driving of the individual sections one after another is shown; however, when the control section 44 can perform parallel processing, the control section 44 may quickly stop the driving of the individual sections concurrently.

By doing so, it is possible to make the power consumption of the projector 10 lower than that in the first power saving mode and reduce the electric power consumption of the electricity storage section 22B efficiently. Incidentally, there is a write period in which an electric charge corresponding to the brightness of each pixel is accumulated when the liquid crystal panel 52 is driven, and the charge draining processing described above is processing for draining (discharging) the accumulated electric charge. This makes it possible to stop the driving in a state in which the liquid crystal panel 52 is reset.

When the mode transitions to the second power saving mode in this manner, the control section 44 immediately performs control to drive the exhaust port shutter 32 so that it is closed by the exhaust port shutter driving section 49 (step S5). Specifically, the control section 44 passes electric current with inverse characteristics to those of the sucking operation to return the plunger P of the solenoid 33D and makes the sucking/sticking holding force smaller, thereby detaching the plunger P by the biasing force of the biasing member 33S. By this returning operation of the solenoid 33D, the control section 44 closes the exhaust port shutter 32. Incidentally, the time during which electric current is passed in this case is a previously set time sufficient for the returning operation of the solenoid 33D, and, when this time has elapsed, the control section 44 stops passing electric current through the solenoid 33D. This is the end of the description of the interruption control (direct power off).

As described above, in this configuration, when an interruption of the external power source (a power failure) is detected, the control section 44 transitions the mode to the second power saving mode which is a state in which the power consumption of the device main body 12 is reduced, that is, the power consumption of the driven section K2 other than the exhaust port shutter 32 is reduced by the driving section K1 other than the exhaust port shutter driving section 49, and drives the exhaust port shutter 32 so that it is closed by the exhaust port shutter driving section 49. Therefore, it is possible to reduce the power consumption of the portion which is irrelevant to the shutter control and assign finite power stored in the electricity storage section 22B to the driving to close the exhaust port shutter 32. This makes it possible to secure power necessary for the driving to close the exhaust port shutter 32.

Therefore, it is possible to close the exhaust port 16 of the projector 10 by reliably closing the exhaust port shutter 32 when the external power source is interrupted while reducing the storage capacity of the electricity storage section 22B. Moreover, according to this configuration, even when the plug of the projector 10 is disconnected from the receptacle, the exhaust port shutter 32 is reliably closed, whereby it is possible to close the exhaust port 16 of the projector 10.

In addition, it is possible to reduce unnecessary electric power consumption and reduce costs and size by optimizing the storage parts inside the power source.

As described above, since the projector 10 with this configuration is provided with the dust filter 34 in the suction port 15, the entry of dust and insects through the suction port 15 is prevented by the dust filter 34. Therefore, by closing the exhaust port 16 with the exhaust port shutter 32, a vent hole of the projector 10 is closed, whereby the entry of dust and insects into the projector 10 is reliably prevented.

Therefore, the projector 10 can reliably prevent the entry of dust and insects from the outside both in a power source interrupted state in which the external power source is unexpectedly interrupted and a power source interrupted state in which the user intentionally disconnects the plug.

As a result, with this configuration, it is possible to provide a dustproof projector that achieves reduction in cost and size by size-reduction of the electricity storage section 22B, the dustproof projector in which the opening is reliably closed when a power failure occurs or in a state in which a plug is disconnected and the entry of dust and insects is reliably prevented.

Moreover, when the external power source detecting section 22A and the control section 44 which function as the interruption detecting section detect that the power supply from the external power source is stopped, the external power source detecting section 22A and the control section 44 start the instantaneous power failure determination processing by which it is determined whether or not there is an instantaneous power failure based on the stop time TBD. When it is detected in the instantaneous power failure determination processing that a power failure which is not an instantaneous power failure has occurred, the external power source detecting section 22A and the control section 44 detect that the external power source is interrupted. Therefore, by making a distinction between an instantaneous power failure and an interruption of the external power source, it is possible to prevent the occurrence of a malfunction. In this case, when an instantaneous power failure occurs, it is possible to operate the projector 10 continuously without closing the exhaust port shutter 32, stopping the function, or performing a restart. This improves the usability of the projector 10.

That is, when a discharge lamp (hereinafter also referred to as a lamp) is adopted as the light source device 51 of the projection display device 10, a predetermined waiting time is necessary to turn on a lamp again, the lamp which has been turned off. However, according to this configuration, even when a voltage drop in the external power source is detected due to the occurrence of an extreme brief instantaneous power failure, the power supply to the light source device 51 is not immediately stopped. Therefore, the lamp can stay on. If the power supply to the lamp is immediately stopped when a voltage drop in the external power source is detected, an image cannot be displayed until a waiting time necessary for turning the lamp on again has elapsed. In this configuration, such a problem does not arise.

Furthermore, when the instantaneous power failure determination processing is started, the control section 44 reduces the amount of light emitted from the light source device (the light source) 51 by the driving section K1, and, when it is determined that a power failure that is not an instantaneous power failure has occurred, the control section 44 stops the driving of the light source device 51 by the driving section K1. Therefore, it is possible to reduce the power consumption of the light source device 51 immediately after the occurrence of the power failure or after the plug is disconnected, making it possible to save the stored power of the electricity storage section 22B. Moreover, in case of an instantaneous power failure, the driving is not stopped while reducing the power consumption of the light source device 51. This allows the user or the like to continue viewing the images.

Moreover, when an interruption of the external power source is detected, the driving section K1 stops the driving of the cooling fan 31, stops the driving of the liquid crystal panel 52 after charge draining processing, stops the driving of the sound outputting section 35, and stops the driving of the output terminal 37 and the indicator lamp 36. This makes it possible to stop the driving of all the portions that are irrelevant to the shutter control, reduce the electric power consumption to a minimum, and secure power necessary for the driving to close the exhaust port shutter 32.

Furthermore, since the exhaust port shutter 32 is opened and closed by the driving of the solenoid 33D and the exhaust port shutter driving section 49 drives the exhaust port shutter 32 so that it is closed by passing electric current through the solenoid 33D, it is possible to close the exhaust port shutter 32 in a short time as compared to a case in which the exhaust port shutter 32 is driven by a motor so that it is closed. This also makes it possible to prevent the entry of dust and insects and achieve reduction in cost and size by reducing the capacity of the electricity storage section 22B.

In addition, in this configuration, the biasing member 33S that biases the exhaust port shutter 32 to a close side is provided, and the exhaust port shutter 32 is closed by the biasing force of the biasing member 33S by releasing the holding force of the solenoid 33D. Therefore, the amount of power necessary for the driving to close the exhaust port shutter 32 is small. This also makes it possible to close the exhaust port shutter 32 reliably and provide a low-cost and long-life product.

The embodiment described above is merely an embodiment of the invention, and any modifications and applications are possible within the scope of the subject matter of the invention.

For example, in the embodiment described above, a case in which driving of all the portions that are irrelevant to the shutter control is stopped has been described; however, the invention is not limited thereto. The driving of at least any one of the portions that are irrelevant to the shutter control may be stopped. For example, the driving of the indicator lamp 36 may not be stopped because the power consumption of the indicator lamp 36 is small, so that notification of the operating state (power-on, a standby state, an error state, and the like) of the projector 10 is continuously provided by the indicator lamp 36.

Moreover, the configuration is not limited to a configuration in which the power consumption of the individual section is reduced to zero by stopping the driving of the individual sections. The power consumption may be reduced by reducing the amount of light emitted from the light source device (the light source) 51, reducing the number of revolutions of the cooling fan 31, or bringing the sound outputting section 35 into a mute state.

Furthermore, the configuration of the electricity storage section 22B is not limited to an electric double layer capacitor. It is also possible to adopt various kinds of elements, such as an electrolytic capacitor, as the configuration of the electricity storage section 22B.

In addition, an LED may be used as the light source device 51. When the LED is used as the light source device 51, it is possible to turn on the light source again immediately after the light source is turned off. Therefore, instead of the light amount reduction processing (step S2) by which the amount of emitted light is reduced, the light source device 51 may be turned off completely by stopping the driving of the light source device 51.

Moreover, in the embodiment described above, a case in which the exhaust port shutter 32 is provided has been described; however, the invention is not limited thereto. A shutter may be provided in the suction port 15, or the projection lens 53 may be provided with a shutter for protecting a lens (a lens shutter). In short, the invention can be widely applied to a technique of controlling a shutter which should be closed when the external power source is interrupted (including a case in which the plug is disconnected).

Furthermore, in the embodiment described above, a case in which the external power source detecting section 22A and the control section 44 function as the interruption detecting section that detects an interruption of the external power source has been described; however, the invention is not limited thereto. The control section 44 may not be used as part of the interruption detecting section, and the interruption detecting section may be provided separately.

Moreover, the projector 10 described above is a projector that projects an image onto a screen by using the transmissive liquid crystal panel 52. However, the projector 10 may be a projector using a reflective liquid crystal panel or a DMD projector using a digital mirror device. Furthermore, the invention is not limited to a three LCD projector that projects a color image by the three liquid crystal panels 52; the invention can also be applied to a projector that projects a color image by displaying an image corresponding to RGB by time division by using one liquid crystal light valve, a single-panel DMD projector provided with a color wheel, and a three DMD projector. In short, the invention can be widely applied to a projection display device having a shutter.

What is claimed is:

1. A projection display device comprising:
a device main body including an image projecting section projecting an image;
a shutter that opens and closes an opening for ventilation, the opening of the device main body;
an electricity storage section storing power from an external power source and supplying the stored power as operating power;
an interruption detecting section detecting an interruption of the external power source, wherein if the interruption detecting section detects a power supply from the external power source is stopped and a time in which the power supply is stopped is longer than a predetermined time, the interruption detecting section detects that the external power source is interrupted; and a control section that performs, if the interruption of the external power source is detected, a control to reduce a power consumption of the device main body and control to drive the shutter so that the shutter is closed by the power supplied from the electricity storage section.

2. The projection display device according to claim 1, wherein the image projecting section has a light source emitting a light for projecting the image, and if the interruption detecting section detects that the power supply from the external power source is stopped, the control section reduces an amount of light emitted from the light source.

3. The projection display device according to claim 2, wherein if the interruption detecting section detects that the external power source is interrupted, the control section stops a driving of the light source.

4. The projection display device according to claim 2, wherein the device main body has at least any one of a fan sending air to the opening, a modulator modulating the light from the light source, a sound outputting section outputting a sound, and an output terminal outputting a predetermined signal to the outside, and if the interruption detecting section detects that the external power source is interrupted, the control section stops a driving of at least any one of the fan, the modulator, the sound outputting section, and the output terminal.

5. The projection display device according to claim 4, wherein if the control section stops the driving of the modulator, the control section stops the driving of the modulator after performing a charge draining processing on the modulator.

6. The projection display device according to claim 1, wherein the shutter is opened and closed by a driving of a solenoid, and the control section drives the shutter so that the shutter is closed by passing an electric current through the solenoid.

7. The projection display device according to claim 6, wherein the shutter has a biasing member biasing the shutter to a close side, and the control section closes the shutter by a biasing force of the biasing member.

8. The projection display device according to claim 7, wherein the shutter is kept in a closed state by the biasing member.

9. The projection display device according to claim 1, wherein the device main body has a suction port covered with a dust filter and an exhaust port functioning as the opening that is closed as a result of the shutter being closed.

10. The projection display device according to claim 1, wherein the predetermined time is 50 msec.

11. A method for controlling a projection display device including a device main body provided with an image projecting section projecting an image and a shutter that opens and closes an opening of the device main body for ventilation, comprising:

detecting an interruption of an external power source to reduce a power consumption of the device main body, wherein if a power supply from the external power source is detected as stopped and a time in which the power supply is stopped is longer than a predetermined time, the external power source is determined to be interrupted; and in response to detecting the interruption of the external power source, driving the shutter so that the shutter is closed using a power stored from the external power source.

* * * * *